United States Patent [19]
Smith, III

[11] Patent Number: 4,817,668
[45] Date of Patent: Apr. 4, 1989

[54] INTEGRAL METAL SEAL FOR HYDRAULIC COUPLING

[75] Inventor: Robert E. Smith, III, Stafford, Tex.

[73] Assignee: National Coupling Company, Inc., Stafford, Tex.

[21] Appl. No.: 104,448

[22] Filed: Oct. 2, 1987

[51] Int. Cl.4 ............................................. F16L 37/28
[52] U.S. Cl. ................................ 137/614.04; 251/368; 277/111; 277/206 R
[58] Field of Search ................ 285/110, 112; 251/368; 137/614.02, 614.04; 277/111, 27, 206 R

[56] References Cited

U.S. PATENT DOCUMENTS

| | | | |
|---|---|---|---|
| Re. 18,296 | 12/1931 | Pierce | 285/110 |
| 2,218,318 | 10/1940 | Pfauser | 137/614.04 |
| 2,730,380 | 1/1956 | Espy et al. | 137/614.04 |
| 3,054,422 | 9/1962 | Napolitono | 285/110 |
| 3,142,498 | 7/1964 | Press | 285/110 |
| 3,473,556 | 10/1969 | Johnson et al. | 285/110 |
| 3,625,251 | 12/1971 | Nelson | 137/614.04 |
| 3,891,246 | 6/1975 | Hopper | 285/110 |
| 4,044,993 | 8/1977 | Wheeler | 251/368 |
| 4,453,566 | 6/1984 | Henderson, Jr. et al. | 137/614.02 |
| 4,457,523 | 7/1984 | Halling et al. | 277/206 R |

Primary Examiner—A. Michael Chambers
Attorney, Agent, or Firm—Arnold, White & Durkee

[57] ABSTRACT

An integral metal-to-metal seal for a subsea hydraulic connector, the seal having a concave leading face extending from the male member body, the concave leading face having a flexible outer rim which seals against the wall of the female member bore. The outer rim is biased against the wall of the female member bore, and further is responsive to hydraulic pressure to flex against the wall of the female member bore.

17 Claims, 2 Drawing Sheets

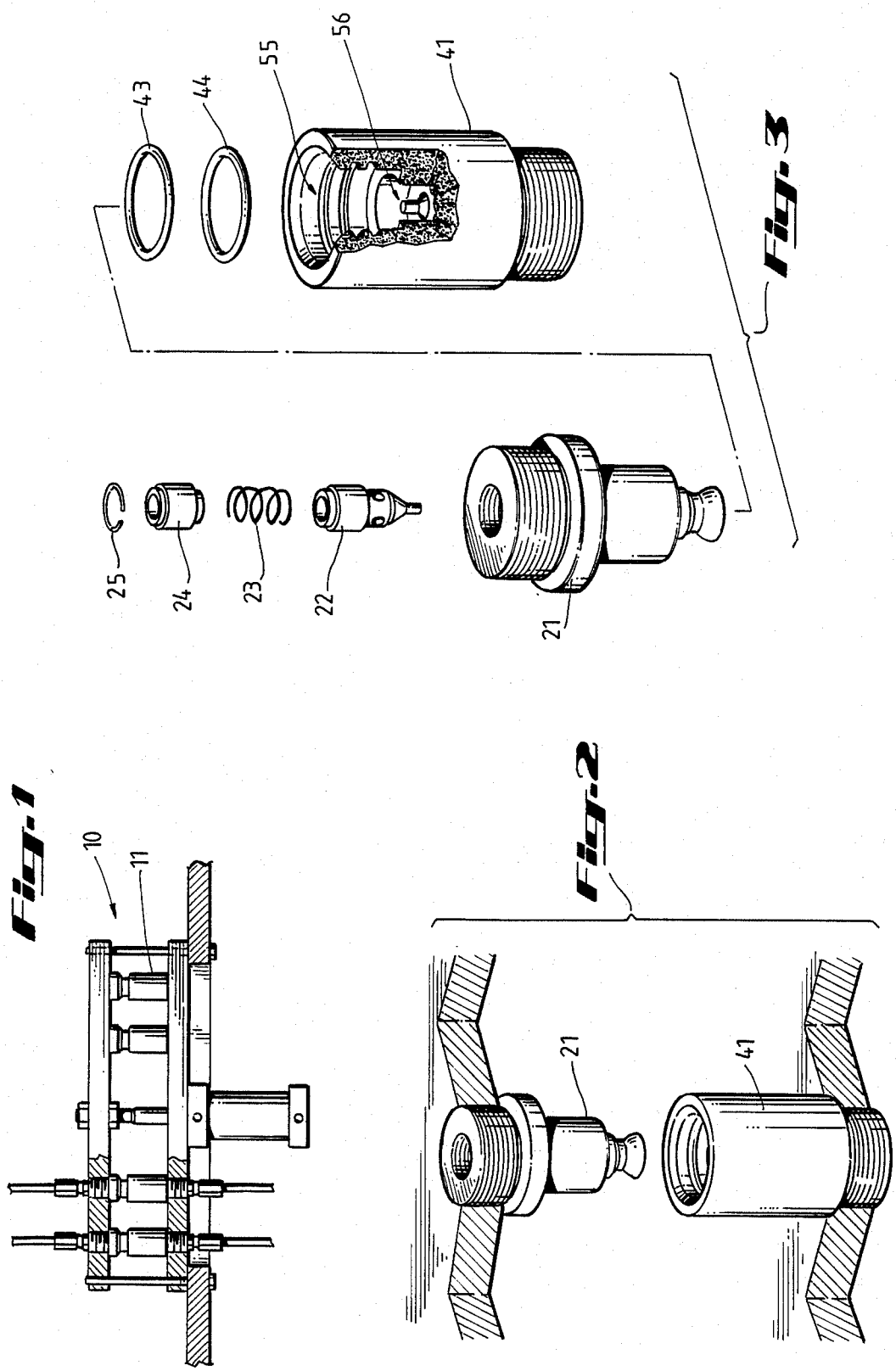

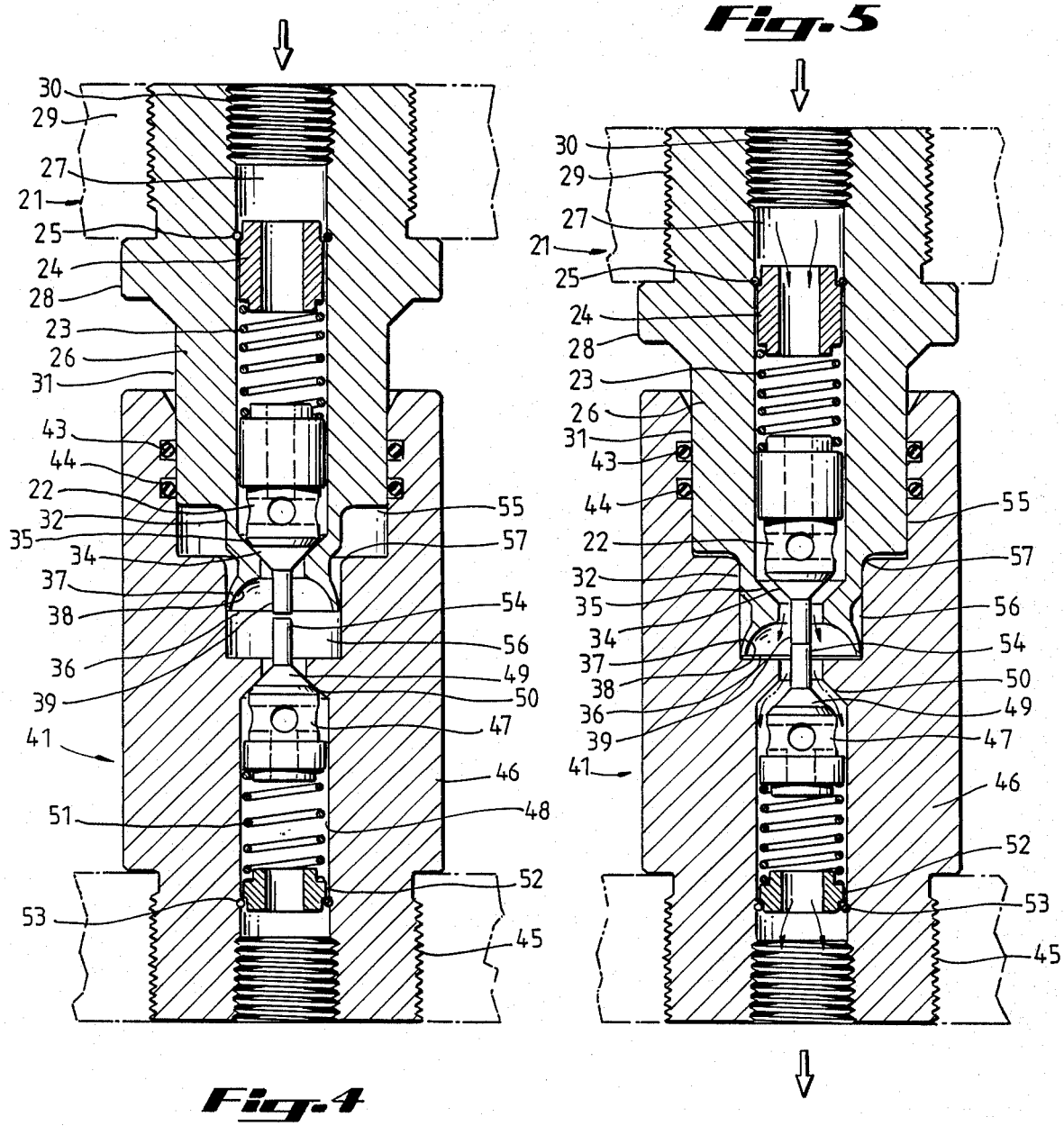

INTEGRAL METAL SEAL FOR HYDRAULIC COUPLING

BACKGROUND OF THE INVENTION

1. Field of Invention

This invention relates, in general, to hydraulic couplings, and specifically to hydraulic couplings used in undersea drilling and production applications. More particularly, the invention involves an integral metal to metal seal for a subsea hydraulic connector, the seal formed at the outer rim of the leading face of the male member of the coupling.

2. Description of the Related Art

Subsea hydraulic couplings are old in the art. The couplings generally consist of a male and a female member with sealed fluid passageways connecting therebetween. The female member generally is a cylindrical body with a relatively large diameter longitudinal bore at one end and a relatively small diameter longitudinal bore at the other. The small bore facilitates connection to hydraulic lines, while the large bore seals and slidingly engages the male member of the coupling. The male member includes a cylindrical portion at one end having an outer diameter approximately equal to the diameter of the large bore in the female member of the coupling. The male member also includes a connection at its other end to facilitate connection to hydraulic lines. When the cylindrical portion of the male member is inserted into the large bore of the female member, according to various embodiments of the device, fluid flow is established between the male and female members.

The male and female members of a hydraulic coupling each typically include a poppet valve slideably received within the bore of each member. Each poppet valve typically includes a conical valve face which seats, in the closed position, against a valve seat at one end of the bore. The poppet valve opens to allow fluid flow and closes the poppet valve face against the corresponding valve seat within the bore to arrest the flow. Generally the poppet valve is spring biased to the closed position.

The poppet valve also includes a poppet valve nose or stem extending from the apex of the valve face along the longitudinal axis of the poppet valve. Contact between the tips of the noses or stems of the male and female member poppet valves forces each valve face away from the valve seat of each member and into the open position for fluid flow therebetween.

Subsea couplings also generally include soft seals positioned within the female member bore to seal the junction between the male and female members. When the cylindrical portion of the male member is inserted into the large bore of the female member, the soft seals, resembling o-rings, either abut the end, or face, of the male member or engage the male member about its circumference. The hydraulic fluid is then free to flow through the male and female portions of the coupling, and the seals prevent that flow from escaping about the joint in the coupling.

The soft seals have numerous disadvantages, the principal ones being (1) the inability of the seal to withstand the deteriorating effects of the subsea environment for extended periods of time, and (2) the inability of the soft seal to contain the higher pressures being imposed on the hydraulic systems.

A crush-type metal seal is available which better withstands both the deteriorating effects of the environment and the higher pressures. The crush-type seal is positioned between the end of the male member of the coupling and the internal end of the large bore in the female member. When the male member is inserted into the female, the metal seal is crushed between the two members and a seal is effectuated between the two. Because of the crushing action, the seal can be used only once. If a coupling is separated for any reason, the once used crushed seal must be replaced with a new seal.

Various other types of metal seals have been placed either in a circumferential groove about the interior of the large bore in the female member, or at the interior end of that bore for engagement with the leading face or end of the male member. Typically, a metal seal is fully energized upon the establishment of fluid communication between the members. Hydraulic pressure urges the seal into engagement with one or both of the members, thereby fully energizing the seal. For example, the hydraulic pressure will urge the seal to expand radially against one or both of the coupling members.

Particularly in the case of face-type seals, there is no mechanism for retention of the seal in the female member. If the coupling is parted under pressure, the face-type seal will generally blow out of the female member receiving bore and be lost. There may also be risk of injury to the operator parting the coupling.

Many types of metal to metal seals also require preloading of the seal before fluid communication is established therebetween. In preloading the seal, the seal is partially energized, that is, the seal is urged into engagement with one or both members before it is fully energized. For example, some types of preloading force the seal to expand radially against one or both of the members before it is fully energized upon fluid communication between the members.

Some types of metal to metal seals require external preload devices for the seal. An external preload mechanism typically is used to prevent relative longitudinal movement between the male member and the female member. A problem with external preload devices is that such a device must overcome the fluid pressure which may urge the members apart. The external device must not only partially energize the seal, but also overcome the hydraulic pressure which urges the members to separate. This is a serious problem particularly when a high pressure is desired for hydraulic lines, and in such a case the hydraulic pressure may overcome the preload device and the sealing relationship may be lost.

The sealing relationship also may be lost in prior art couplings that do not employ external preload devices. This problem is caused by any relative longitudinal movement of the coupling members. Any longitudinal movement between the members cannot be tolerated without sacrificing the sealing relationship.

SUMMARY OF THE INVENTION

The present invention overcomes the above mentioned disadvantages by providing a coupling wherein the seal is integral with the male member. The male member face has an outer rim which sealingly engages the wall of the female member receiving bore. This seal requires no external preload devices. The sealing outer rim of the male member face slides into the receiving bore of the female member. The seal is partially energized when the outer rim is compressed slightly upon insertion into the receiving bore. Hydraulic pressure exerted on the leading face of the male member further flexes the outer rim outwardly against the female member bore and fully energizes the seal. Because the outer rim tightly fits within the receiving bore, the sealing relationship is maintained while allowing some relative longitudinal movement of the coupling members. Further, if the male and female members are parted under pressure, there is no danger of the seal from blowing out. Thus, the connection can be broken and remade numerous times.

BRIEF DESCRIPTION OF THE DRAWINGS

FIG. 1 is an elevational view of a manifold incorporating couplings such as that of the present invention.

FIG. 2 is a perspective view of a coupling of the present invention showing how the coupling might be connected to the manifold of FIG. 1.

FIG. 3 is an exploded perspective view of one embodiment of the present invention with the female member body partially cut away.

FIG. 4 is a section view of the male member and the female member in the closed portion according to a preferred embodiment of the present invention.

FIG. 5 is a section view of the male member and the female member in the open position according to a preferred embodiment of the present invention.

DETAILED DESCRIPTION OF THE PREFERRED EMBODIMENT

FIG. 1 is an elevational view of a manifold 10 which is commonly used with undersea hydraulic couplings. The couplings 11 are generally connected to opposing plates of the manifold and are held together by bolts or hydraulic members attached to the plates. As shown in FIG. 2, the male member 21 is commonly attached to one plate while the female member 41 is attached to the second plate so as to face male member 21 and align with it. The male and female members may be attached to the manifold plates using various means, such as set screws or threads. Techniques for attaching the members to such plates are well known to those skilled in the art.

FIG. 3 is an exploded perspective view of the coupling of the present invention. As shown, the main components of the coupling include male member 21, female member 41, and male member poppet valve 22. The male member of the coupling further includes valve spring 23, spring retainer 24, and collar clip 25. The spring retainer 24 anchors one end of the spring 23 within the male member bore, while the spring urges the poppet valve into the closed position.

The female member includes outer receiving chamber 55 and inner receiving chamber 56. The outer receiving chamber of the female member also includes an outer elastomeric seal 43 and an inner elastomeric seal 44. The male member and female member each comprise subcomponents which will be more fully described below.

FIG. 4 is a section view of the male and female members having the poppet valves in an open position as the male member is inserted into the female member. At one end of the male member body is an outer shoulder 28 and a handle 29 which optionally is threaded or otherwise connected to a manifold plate. The male member body 26 includes a central bore 27 extending therethrough. The central bore 27 is cylindrical and preferably has an internally threaded section 30 for connection to a hydraulic line at the handle end thereof. The male member poppet valve 22 is slideably received in the central bore 27.

The male member body 26 further includes a first cylindrical section 31 and a second cylindrical section 32 having an outer diameter substantially less than the diameter of the first section. The female member includes an outer receiving chamber 55 and an inner receiving chamber 56 with a sloped curved inner shoulder 57 therebetween. The first cylindrical section 31 of the male member is slideably received within the outer receiving chamber, while the second cylindrical section 32 is slideably received within the inner receiving chamber. The outer diameter of the first cylindrical section 31 is approximately equal to the diameter of the outer receiving chamber 55 of the female member, while the outer diameter of the second cylindrical section 32 is approximately equal to the diameter of the inner receiving chamber 56. There is a sloped or curved shoulder 33 between the first cylindrical section 31 and the second cylindrical section 32.

The male member further comprises a poppet valve 22 having a conical poppet valve face 34 and nose 39 extending from the apex of the face. Poppet valve face 34 seals with the valve seat 35 until the poppet valve nose 39 of the male member engages the poppet valve nose 54 of the female member to force each poppet valve from the closed to the open position.

The female member 41 includes a handle 45 which optionally may be threaded to a manifold. The female member 41 also comprises a body 46, an outer receiving chamber 55, an inner receiving chamber 56 and a bore 48 for slideably receiving the poppet valve 47.

Poppet valve 47 of the female member is constructed substantially similar to the poppet valve 22 of the male member. The female member poppet valve 47 is slideably received within the bore 48 of the female member. A valve spring 51 urges the valve face 49 against the valve seat 50. A spring retainer 52 anchors the valve spring 51. A collar clip 53 is used to hold the spring retainer 52 in place.

Both the male member poppet valve 22 and the female member poppet valve 47 as used in the present invention function as typical poppet valves to establish fluid communication between the coupling members when the manifold plates are placed together. Each valve spring urges the respective poppet valve into a normally closed position until the male member poppet valve nose 39 and the female member poppet valve nose 54 are mutually engaged.

At the leading end of the second cylindrical section 32 is the leading face 36 of the male member. The wall of the leading face has a substantially thinner cross section than the longitudinal outer wall of the male member body. The leading face 36 further comprises an outer rim 37. The outer rim encircles a concave surface 38.

The outer rim 37 of the leading face 36 of the male member has a thin cross section and is flexible in the radial direction towards the wall of the inner receiving chamber. The outer rim 37 preferably has a gold plated surface to assure a tight metal to metal seal. Initially, the outer diameter of the outer rim 37 is slightly greater than the diameter of the inner receiving chamber 56 of the female member. As shown in FIG. 4, when the second cylindrical section 32 of the male member is slideably engaged into the female member inner receiving chamber 56, the outer rim flexes to slide past the sloped inner shoulder 57 of the female member and slightly compresses as it enters the inner receiving chamber. The outer rim is sealingly engaged against the wall before the male and female poppet valves begin to open. As the leading face 36 moves into the inner receiving chamber 56, the outer rim 37 forms a metal to metal seal with the receiving chamber wall. Thus, the seal is partially energized before the poppet valves open and fluid communication is established between the members. FIG. 5 shows the male and female members with the poppet valves open.

As shown in FIG. 5, when fluid communication is established between the male and female members, fluid pressure is exerted on the concave surface 38 at the leading face of the male member. This fluid pressure against the outer rim of the male member flexes that outer rim into sealing engagement with the wall of the inner receiving chamber, thereby fully energizing the metal to metal seal and assuring a tight sealing fit with the inner receiving chamber wall.

The present invention provides a metal to metal seal which is integral with the male member of the coupling. The seal is partially energized when the outer rim is slightly compressed as it enters the inner receiving chamber. The seal is fully pressure energized during fluid communication between the members.

The present invention requires no preload devices. Additionally, the seal remains engaged even during relative longitudinal movement of the coupling members. The sealing relationship is maintained as long as the outer rim remains within the inner receiving chamber. The connection can be broken and remade numerous times without damaging the seal or effecting the seal characteristics of the coupling.

Although in a preferred embodiment the male member comprises a first and a second cylindrical section, the metal to metal seal of the present invention may be realized with a male member having a single cylindrical section. Also, the female member may have a single receiving chamber rather than a stepped receiving chamber.

Although variations in the embodiment of the present invention may not each realize all of the advantages of the invention, certain features may become more important than others in various applications of the device. The invention, accordingly, should be understood to be limited only by the scope of the appended claims.

What is claimed is:

1. A hydraulic coupling comprising a male and a female member, each of the members comprising a body having a longitudinal bore extending therethrough, a valve seat at one end of the longitudinal bore, and a poppet valve slideable between an open position and closed position in relation to the valve seat for regulating fluid flow through the longitudinal bore;
the female member having a cylindrical receiving chamber for slideably receiving the male member therein; and the male member having a leading face with a flexible outer rim to form a metal-to-metal seal with the wall of the receiving chamber at any position within the receiving chamber and maintain the seal during relative movement between the male and female member.

2. The hydraulic coupling of claim 1 wherein the outer rim is urged against the wall of the receiving chamber by fluid pressure.

3. The hydraulic coupling of claim 1 wherein the outer rim of the male member is biased against the wall of the receiving chamber.

4. The hydraulic coupling of claim 1 wherein the receiving chamber comprises an outer cylindrical bore extending between a first end of the female member and a first inner shoulder intermediate the female member; and an inner cylindrical bore smaller than the outer bore; the inner bore extending between the first inner shoulder and a second inner shoulder adjacent the value seat of the female member; and wherein the outer rim of the male member leading face maintains sealing engagement against the longitudinal wall of the inner bore at any position within the bore and during relative movement between the male and female member.

5. The hydraulic coupling of claim 4 wherein the male member includes a first cylindrical section slideable within the female member outer bore and a smaller second cylindrical section slideable within the female member inner bore; the first section integral with the second section; the outer rim of the face of the second section biased to sealingly engage the longitudinal wall of the inner bore.

6. The hydraulic coupling of claim 4 wherein the outer rim of the leading face of the male member forms a metal seal with the longitudinal wall of the inner bore upon initial insertion of the second cylindrical section into the female member inner bore, the seal remaining engaged during relative longitudinal movement of the members.

7. The hydraulic coupling of claim 4 wherein a curved surface is formed between the first shoulder and the inner bore of the female member.

8. A hydraulic coupling comprising:
a cylindrical female member having a body and a circular bore with first and second ends, the bore extending through said body;
a stepped shoulder extending inwardly from the wall of the bore intermediate the ends, the shoulder comprising an outer separate shoulder surface and an inner separate shoulder surface progressively farther spaced from the first end and closer to the longitudinal axis of the bore;
a cylindrical male member having a body and a circular bore with first and second ends, the bore extending through the body; the male member body having a stepped outer surface for slideably fitting within the circular bore of the female member;
a cup-shaped leading face on the male member, the rim of the cup-shaped leading face forming a metal to metal seal with the wall of the female member bore intermediate the outer shoulder surface and the separate inner shoulder surface, the metal-to-metal seal being maintained as the male member slideably moves between the outer shoulder surface and inner shoulder surface.

9. The hydraulic coupling of claim 8 further comprising a poppet valve slideable within the female member bore and a poppet valve slideable within the male member bore, the poppet valves mutually engageable to establish fluid flow between the coupling members.

10. The hydraulic coupling of claim 8 wherein the cup-shaped leading face comprises a flexible outer rim, the flexible outer rim being compressable to slideably fit within the female member bore.

11. The hydraulic coupling of claim 8 wherein the cup-shaped leading face comprises a flexible outer rim, the outer rim being urged against the female member bore by fluid pressure between the members.

12. The hydraulic coupling of claim 8 wherein the female member further includes at least one annular groove in the wall surface of the female member bore, and an annular elastomeric seal fitting within said annular groove.

13. The hydraulic coupling of claim 12 wherein the annular elastomeric seal sealingly engages the body of the male member upon insertion of the male member into the female member bore.

14. The hydraulic coupling of claim 8 wherein the rim of the male member leading face is gold plated.

15. A metal-to-metal seal integrally connected to a male member for sealing engagement at any axial position within a cylindrical female member bore in a hydraulic coupling, comprising:

a concave leading face extending from the male member body, the concave leading face having a flexible outer rim;

the outer rim compressable to slideably fit within the female member bore; the outer rim responsive to hydraulic pressure to sealingly engage the wall of the female member bore.

16. The seal of claim 15 wherein the outer rim of the concave leading face is gold plated.

17. The seal of claim 15 wherein the cross section of the outer rim of the leading face is thinner than the cross section of the longitudinal wall of the male member body.

* * * * *